Nov. 17, 1970     B. E. STARKEY     3,541,536

SIGNAL COMBINATOR

Filed Dec. 21, 1967

United States Patent Office

3,541,536
Patented Nov. 17, 1970

3,541,536
SIGNAL COMBINATOR
Billy E. Starkey, Anchorage, Alaska, assignor to Mobil Oil Corporation, a corporation of New York
Filed Dec. 21, 1967, Ser. No. 692,475
Int. Cl. G08c 19/16
U.S. Cl. 340—179
5 Claims

ABSTRACT OF THE DISCLOSURE

This specification discloses a system for combining the output from a plurality of impulse transmitters. The system comprises first and second control means, first and second output means, and a read-out means. Each of the control means responds to an impulse from an associated transmitter to apply a control signal to an associated output means and concomitantly block the response of the other control means to an impulse from its respective transmitter. Each of the output means responds to a control signal to produce an output signal which is applied to the read-out means. The time durations of the several signals are such that a combined read-out representative of the output from both transmitters is obtained even though simultaneous pulses from the transmitters are applied to the system.

BACKGROUND OF THE INVENTION

This invention relates to a signal combinator, and more particularly to a new and improved system for combining the output signals of a plurality of impulse transmitters.

It is oftentimes desirable to obtain automatically a combined read-out from a plurality of impulse transmitters. For example, in fluid distribution systems there may be provided a number of flow meters from which a combined read-out is desired. Such flow meters typically are equipped with impulse transmitters which provide a digital output indicative of the volume of fluid measured. Typically, such impulse transmitters may produce an electric signal for each unit volume of fluid which passes through the meter. In those instances where information regarding the cumulative flow rate through several meters of a distribution system is desired, it is many times advantageous to combine the output of the impulse transmitters associated with such meters into a common read-out.

SUMMARY OF THE INVENTION

In accordance with the present invention, there is provided a new and improved system for economically and reliably combining the output of a plurality of impulse transmitters such as those associated with fluid flow meters. The invention comprises first and second control means, adapted to receive time-spaced signals respectively from a first and a second of the impulse transmitters, first and second output means, and a read-out means. Each of the control means produces a control signal in response to a signal from its respective transmitter. The duration of the control signal is shorter than the duration of a signal from the other transmitter. Concomitantly with the production of a control signal each control means blocks the response of the other control means to a signal from the other transmitter. The signals from the first and second control means are applied respectively to first and second output means, each of which produces an output signal of a duration shorter than that of the applied control signal and shorter also than the difference between the duration of a control signal from the opposite control means and the period of the time-spaced signals from the opposite transmitter. The read-out means is responsive to signals from the first and second output means to produce a combined read-out representative of the output of the first and second impulse transmitters.

In a preferred embodiment of the invention, each control means comprises a control circuit having a normally open transmitter switch which is adapted to be closed in response to a signal from one of the transmitters and a normally closed blocking switch. Each of the output means comprises an output circuit having a normally open switch therein. Actuating means are provided in each of the control circuits, each of which means is responsive to current flow in its respective circuit for closing the normally open switch in the associated output circuit and concomitantly opening the blocking switch in the other control circuit. Each of the control and output circuits includes time-limit means for blocking the circuit to current flow after a time delay period. The time-delay means in each output circuit provides a shorter time-delay period than that period provided by the time-limit means in the associated control circuit. The read-out means is responsive to current flow in each of the output circuits such that a combined read-out is produced.

DESCRIPTION OF SPECIFIC EMBODIMENTS

Figure 1:
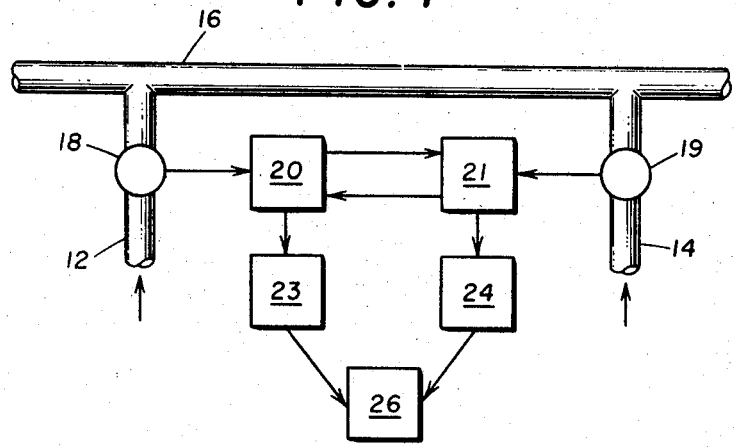
FIG. 1 is a diagrammatic illustration showing the invention as used in conjunction with the meters of a fluid distribution system.

With reference to FIG. 1, there is shown a fluid distribution system comprising branch lines 12 and 14 which extend from suitable fluid sources (not shown) to a common flowline 16. By way of illustration it will be assumed that lines 12 and 14 extend from separate sources of petroleum fluid such as crude oil or natural gas and that it is desirable for test purposes to periodically determine the flow rate from each such source. Thus, branch lines 12 and 14 are provided with fluid flow meters 18 and 19 from which separate read-outs can be obtained. In normal operation it is necessary to measure only the total flow from both of the fluid sources. In this instance, certain advantages are involved in automatically providing a combined read-out representative of such total flow. For example, it is often necessary to transmit such information over long distances utilizing suitable communication channels such as telephone lines. Significant savings may be effected by combining the digital read-out from the meters into a combined count for transmittal to such a central station.

The meters 18 and 19 may be of any suitable design which provides a digital read-out. Typically, such meters are equipped with a transducer which sends out an electric impulse for each unit volume of fluid measured. The output signals from the meters occur at random with respect to each other such that simultaneous or near-simultaneous signals may be produced from separate meters. The present invention combines such signals and assures a combined read-out representative of all such signals by temporarily gating out the application of one signal to a read-out means while applying another signal to the read-out means.

More particularly, and as shown schematically in FIG. 1, the invention comprises first and second control means 20 and 21, respectively, first and second output means 23 and 24, respectively, and a read-out means 26. Each of the control means 20 and 21, in response to a signal from an associated meter, produces a control signal which is applied to an associated output means while at the same time blocking the response of the other control means to a signal from its associated meter. Thus, control means 20, in response to a signal from meter 18, produces a control signal which is applied to output means 23. Concomitantly with the generation of this control signal, which is of a shorter duration than the signal from meter 19, the control means 20 functions to block the response of the control system 22 to a signal from meter 19. Thus, should a signal be generated simultaneously from meter 19 the invention provides for a delayed response to this signal until a representation of the signal from meter 18 is applied to the read-out means 26.

Each of the output means 23 and 24 responds to a control signal applied thereto to produce an output signal to which the read-out means 26 responds. Such output signal is of a duration shorter than that of the applied control signal and also shorter than the difference between the duration of a control signal applied to the other output means and the period of the time-spaced signals applied to the other control means from its associated transmitter. Thus, the output signal generated by output means 23, for example, is of a duration shorter than the control signal produced by control means 20. Also, the duration of this output signal is shorter than the difference between the duration of a control signal produced by control means 21 and the period of the signals applied from meter 19 to control means 21.

Preferably, the sum of the duration of an output signal from one of means 23 and 24 and the duration of a control signal produced by the opposite control means is less than the duration of a meter signal applied to such opposite control means. Thus, the duration of a signal from output means 23 plus the duration of a signal from control means 21 is less than the duration of a signal from meter 19. Similarly, the duration of a signal from output means 24 plus the duration of a signal from control means 20 is less than the duration of a signal from meter 18.

Figure 2:
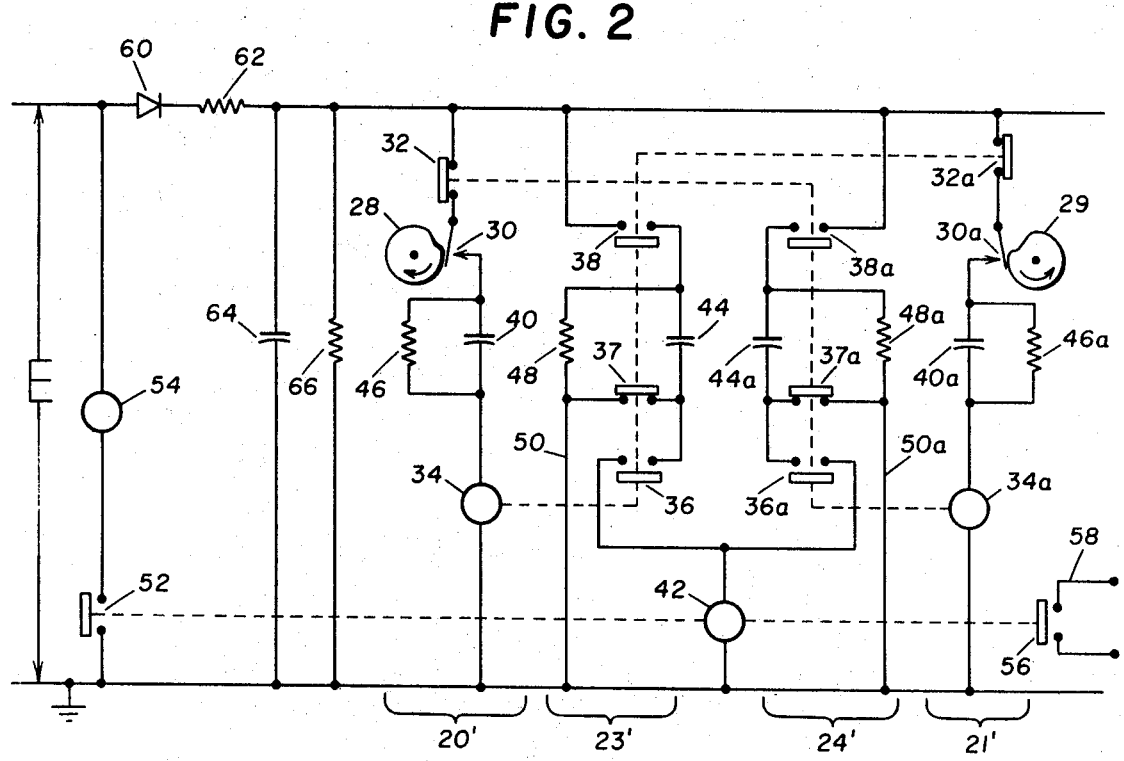
FIG. 2 is an electrical schematic illustrating a preferred embodiment of the invention.

Turning now to FIG. 2, there is illustrated a circuit schematic showing a preferred embodiment of the invention. In FIG. 2 the various circuits corresponding to the control means 20 and 21 and the output means 23 and 24 are designated by brackets 20', 21', 23', and 24', respectively. Signals from the meters 18 and 19 are applied to the combinator system through means of cams 28 and 29, respectively. In control circuit 20', for example, cam 28 is mechanically coupled to the meter 18 and is responsive to fluid flow through the meter such that the cam closes a transmitter switch 30 each time a unit volume of fluid passes through the meter. Upon closure of switch 30 the control circuit is connected to a suitable D-C voltage source through a normally closed blocking switch 32 and a switch-actuator 34, which controls switches 36, 37, and 38 in output circuit 23' and switch 32a in control circuit 21', is energized. The actuator 34, which desirably takes the form of a conventional multi-contact relay as shown in FIG. 2, is energized for approximately the duration of the charging time of a capacitor 40. During this time normally open switches 36 and 38 in output circuit 23 are closed to energize a read-out relay 42 by the charging current through a capacitor 44 in the first output circuit. After the capacitor 44 is charged, the relay 42 drops out similarly as relay 34 in the first control circuit. Thus, capacitors 40 and 44 function as time-limit means to limit the operating cycles of relays 34 and 42, respectively, even though their respective circuits are closed.

Each of the control and output circuits includes means for discharging the time-limit capacitors after each cycle of operation. Thus, upon opening of the transmitter switch 30 in circuit 20', the capacitor 40 is discharged through a high impedance shunt comprising a resistor 46. In output circuit 23, capacitor 44 is discharged through a resistor 48 upon the closing of switch 37 when relay 34 drops out. During this time, the negative side of the capacitor 44 is connected to ground through switch 37 and a lead 50 in order to equalize negative potentials while the capacitor is discharging. While this arrangement is preferred, the discharge means for capacitor 44 may be identical to that described above with reference to capacitor 40, in which case lead 50 and switches 36 and 37 would not be present.

The circuits 21' and 24' are identical to circuits 20' and 23', respectively, and like elements are identified by the same reference numerals subscripted by $a$. In circuit 21' cam 29 is mechanically coupled to meter 19. As cam 29 closes the transmitter switch 30a in control circuit 21', relay 34a is energized for approximately the charging time of capacitor 40a. Relay 34a opens contact 37a and closes contacts 36a and 38a in the second output circuit 24' and opens the normally closed blocking switch 32 in circuit 20'. When the second output circuit 24' is closed, the relay 42 is energized for approximately the charging time of the capacitor 44a.

Each time relay 42 is energized it closes a contact 52, thus energizing an accumulating counter 54 which provides for a local read-out of the combined pulse output of meters 18 and 19. In addition, relay 42 closes a contact 56 to produce a digital signal which may be telemetered to a remote recording station via a communication channel 58. The read-out means may take other forms than that shown. For example, where only a local read-out is desired, the relay 42 may be replaced by an accumulating counter similar to the counter 54.

The charging time of capacitor 44 is shorter than the charging time of capacitor 40 and the charging time of this latter capacitor is in turn shorter than the minimum duration of switch closure by cam 29. In addition, the sum of the charging times of capacitors 44 and 40a is shorter than the minimum cycle period of switch operation by cam 29. For example, if at maximum flow through the meter 19, switch 30a is closed for a time duration of ten seconds and at a frequency of once every fifteen seconds, i.e., a switch operation period of fifteen seconds, the charging time of capacitor 40 should be less than ten seconds. In addition, the sum of the charging times of capacitor 40a and capacitor 44 should be less than fifteen seconds. These same relationships hold true with regard to the signals from meter 18. Thus, assuming the same switch operation period and closure duration by cam 28 as by cam 29 capacitor 40a should similarly have a charging time of less than ten seconds and the sum of the charging times of capacitors 40 and 44a should be less than fifteen seconds.

The relationships described above ensure the application of simultaneous or near-simultaneous meter signals to read-out relay 42 and also ensure that such signals are applied to the read-out means on a time-share basis. For example, upon closure of switch 30, the control signal applied to the output circuit 23' and the concomitant blocking of a signal from meter 19 is for a time duration less than the duration of a signal from meter 19. Thus, when the control signal is terminated, i.e., when relay 34 has dropped out switch 30a still will be in a closed position such that relay 34a will be energized. In addition, relay 42 is in all cases given an opportunity to drop out between the application of signals from the various transmitters. This will ensure that the local and remote counters controlled by the relay 42 will be given an opportunity to advance for each unit volume of fluid measured.

The embodiment of the invention shown in FIG. 2 was successfully tested utilizing the following circuit parameters. The combinator circuit was connected to a 120-volt 60-cycle single-phase A-C power source E through a selenium rectifier 60. A 100 ohm 1 watt resistor 62 was connected in series with the rectifier to serve as a surge current protector and a 40 microfarad capacitor 64 was provided to serve as a filter for the D-C circuit. A 20K ohm 10 watt resistor 66 was provided to regulate the D-C voltage.

Resistances 46, 48, 48a and 46a were each 100K ohm 1 watt resistors. Capacitors 40 and 40a were 100 microfarad capacitors and capacitors 44 and 44a were 60 microfarad capacitors. Under the above described conditions the charging time of each of capacitors 40 and 40a was approximately three and one-half seconds and the charging time of each of capacitors 44 and 44a was approximately one and one-half seconds.

Having described specific embodiments of the instant invention it will be understood that further modifications thereof may be suggested to those skilled in the art, and it is intended to cover all such modifications as fall within the scope of the appended claims.

What is claimed is:

1. In a system for combining the output from a plurality of impulse transmitters, the combination comprising:

first and second control means for receiving time-spaced signals, respectively, from a first and a second of said transmitters, each of said control means comprising means responsive to a signal from its respective transmitter for producing a control signal of a duration shorter than that of a signal from the other of said transmitters and means for concomitantly blocking the response of the other of said control means to a signal from the other of said transmitters;

first and second output means for receiving signals from said first and second control means, respectively, each of said output means being responsive to a signal received from its respective control means for producing an output signal, said first output means signal being of a duration shorter than that of said first control means signal and shorter than the difference between the duration of said second control means signal and the period of the time-spaced signals from said second transmitter, said second output means signal being of a duration shorter than that of said second control means signal and shorter than the difference between the duration of said first control means signal and the period of the time-spaced signals from said first transmitter;

read-out means responsive to the signals from said first and second output means for producing a combined read-out thereof.

2. The combination of claim 1 wherein the sum of the durations of said first control means signal and said second output means signal is less than the duration of a signal from said first transmitter and the sum of the durations of said second control means signal and said first output means signal is less than the duration of a signal from said second transmitter.

3. In a system for combining the output from a plurality of impulse transmitters, the combination comprising:

(a) first and second control circuits each having a normally open transmitter switch adapted to be closed in response to a signal from one of said transmitters and a normally closed blocking switch;

(b) first and second output circuits each having a normally open switch therein;

(c) actuating means in said first control circuit responsive to current flow in said circuit for closing said first output circuit switch and concomitantly opening said second control circuit blocking switch;

(d) time-limit means in said first control circuit for blocking said circuit to current flow after a time delay period;

(e) time-limit means in said first output circuit for blocking said circuit to current flow after a time delay period shorter than the period recited in paragraph (d);

(f) actuating means in said second control circuit responsive to current flow in said circuit for closing said second output circuit switch and concomitantly opening said first control circuit blocking switch;

(g) time-limit means in said second control circuit for blocking said circuit to current flow after a time delay period;

(h) time-limit means in said second output circuit for blocking said circuit to current flow after a time delay period shorter than the period recited in paragraph (g); and (i) read-out means responsive to current flow in said first and second output circuits.

4. The combination of claim 3 wherein each of said control circuit time-limit means comprises a capacitor in series with said actuating means and means for discharging said capacitor after opening of said transmitter switch.

5. The combination of claim 4 wherein each of said output circuit time-limit means comprises a capacitor exhibiting a charging time less than the charging time of the capacitor in an associated control circuit.

References Cited

UNITED STATES PATENTS 2,343,619    3/1944    Luhrs _____ 340—179
3,059,228   10/1962    Beck et al. _____ 340—179

DONALD J. YUSKO, Primary Examiner

C. MARMELSTEIN, Assistant Examiner

U.S. Cl. X.R.

340—182, 203